United States Patent [19]
Breitmeier

[11] 3,708,684
[45] Jan. 2, 1973

[54] METHOD AND MEANS FOR CONTINUOUS DISTRIBUTION OF ELECTRICAL ENERGY

[76] Inventor: Max Breitmeier, Oetwilerstrasse 89, Thalwil, Switzerland

[22] Filed: May 7, 1971

[21] Appl. No.: 141,143

[30] Foreign Application Priority Data

May 14, 1970 Switzerland..........................7208/70

[52] U.S. Cl..................................................307/35
[51] Int. Cl.............................................H02j 3/14
[58] Field of Search..............307/35, 32, 31, 11, 149

[56] References Cited

UNITED STATES PATENTS 2,789,197   4/1957   Boehm..............................307/35 X 3,185,855   5/1965   Kelly et al. ............................307/35

*Primary Examiner*—Herman J. Hohauser
*Attorney*—Toren & McGeady

[57] ABSTRACT

In the power distribution system disclosed, a main line feeds many secondary lines. Each secondary line is split into two branch lines. A maximum regulator in the first of each pair of branch lines limits the output in the first of each pair of branch lines. An output regulator in the second of each of the branch lines controls the current in the second in each of the branch lines in response to the output of the corresponding first branch line. Control means responsive to the total output of all the secondary lines further regulates the output regulators in each of the second branch lines.

13 Claims, 2 Drawing Figures

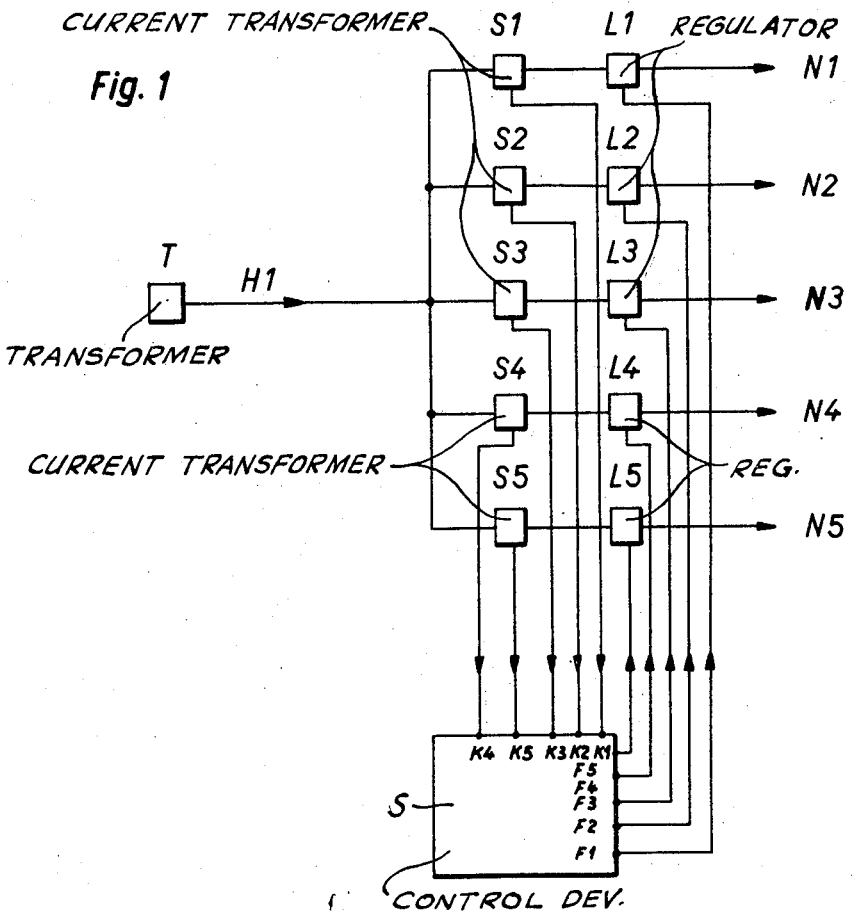
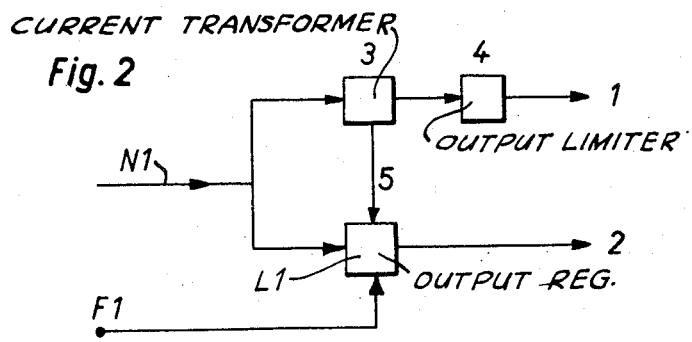

METHOD AND MEANS FOR CONTINUOUS DISTRIBUTION OF ELECTRICAL ENERGY

BACKGROUND OF THE INVENTION

This invention relates to methods and means for continuous distribution of electrical energy from a main line into several secondary lines.

Increasing use of electrical appliances with high power consumption, such as electric washing machines, electric heaters, etc. in modern households requires optimum utilization of the existing working capacities of electrical power supply systems.

The working capacity of a system is generally limited by the load capacity of the lines, the transformers, and the generators. The load capacity depends upon the mean consumption by households plus safety tolerances. On the other hand, the load capacity cannot be selected to be too high because of the inherent extra costs involved in supplying equipment with such high capacities.

The utilization of existing working capacity of electric power supply systems has heretofore been controlled in the electric power plants either by the rates charged or by remote-control connections and disconnections of electrical appliances. In this way a part of the working capacity has been utilized during periods where the consumption of electric power is very low, for example, at night. Excessive consumption of power during peak hours can be prevented in this way. In general such control assure that the load capacity of the lines is not exceeded. To insure safe usage of equipment with this type of power control, safety tolerances in excess of the actual load capacity are built into lines and transformers. While such power control does provide for avoiding excess power consumption it does not serve to utilize the working capacity of the system completely. Apart from the power consumed during peak hours a great portion of the existing power supply system remains under-utilized. Furthermore, power control systems which operate by connecting and disconnecting circuits merely represent a discreet intervention into the power consumption. This contrasts to a desired steady optimum power control.

Electric storage heaters are an example of the type of devices generally operated by remote control from an electric power plant. Such operation generally occurs between 10 PM and 6 AM. Substantial connecting capacity in the form of lines and transformers is required to allow storage of the necessary heat during this limited 8 hour period. However, by utilizing continuous power control the charging time of the regenerator furnace could be extended to 24 hours. Reduced power could be supplied for a few hours. Since the total energy is supplied over a longer period of time less power need be supplied at any one particular time. This would result in considerable reduction in the necessary capacity of the connecting lines.

There are known variations of the conventional forms of power control. For example, an additional power consumption system such as one composed of one or more regenerative furnaces, is arranged in each secondary line. These lines are disconnected, switched to a lower power condition, or both during the times when the main line is subjected to load peaks. In such cases the reduced power is a fixed defined fraction of the normally used power. This also fails to permit continuous and optimal control of the power taken from each secondary line. It fails to allow full utilization of the working capacity of each secondary line.

An object of the invention is to eliminate the above described disadvantages.

Another object of the invention is to improve power distribution systems and methods.

SUMMARY OF THE INVENTION

According to a feature of the invention these objects are obtained and the disadvantages obviated by limiting the maximum value of the power through each secondary line by means of an output regulator in each line and by controlling the output regulators in response to the output of each of the secondary lines so that the sum of the power given off through all the secondary lines does not exceed the load capacity of the main line.

According to another feature of the invention each secondary line is divided into two branch lines. The first branch line is loaded randomly. An output regulator in the second branch line of each secondary line responds to the energy being delivered by the first of the branch lines and limits the output of the second branch line to value determined by the difference between the maximum energy of the secondary line and the energy actually being drained through the first branch line. Thus, the second branch line merely supplies residual energy. Specifically, the energy which is not being drawn by the first branch line but which is available from the secondary line can be taken continuously from the second branch line and applied for example to a heat accumulator. This makes it possible to fully utilize the working capacity of each secondary line.

By virtue of these features the energy being drawn through each secondary line is limited continuously to a maximum value which corresponds to the load capacity of the secondary line.

According to another feature of the invention all the output regulators of the secondary lines are connected to a control device which responds to the power drawn by each of the secondary lines so as to continuously limit the power drawn by the secondary line to a maximum value which is determined by the load capacity of the main line.

By virtue of these features the output regulators in each secondary line which are connected to each other through the control device prevent overloading of the main line or of a transformer or generator feeding the main line. These are generally not arranged for continuous balancing of the full working capacity of the electric power system but for an averaged consumer output.

According to another feature of the invention the control device continuously varies the prescribed maximum value. The control device furthermore furnishes an exact continuous limitation of the total power. Thus given safety tolerances can be lowered and the working capacity of the electric power system increased. The control device operates to prevent current peaks during peak hours of consumption.

According to another feature of the invention, the output regulator includes a semiconductor discharge device such as a silicon control rectifier.

According to still another feature of the invention the output regulator includes a control discharge tube such as a thyratron or an ignitron.

According to yet another feature of the invention the output regulator is composed of a variable transformer or a magnetic amplifier.

These and other features of the invention are pointed out in the claims. Other objects and advantages of the invention will become obvious from the following detailed description when read in light of the accompanying drawings.

BRIEF DESCRIPTION OF THE DRAWINGS

FIG. 1 is a schematic block diagram illustrating a system embodying features of the invention and including a main line with secondary lines and output regulators connected to a control device; and FIG. 2 is a schematic block diagram of a portion of the system in FIG. 1 and also embodying features of the invention, showing a secondary line with two branch lines and the output regulator.

DESCRIPTION OF PREFERRED EMBODIMENTS

In FIG. 1 the main line H1 of a distribution system receives power from a transformer T. The main line H1 then delivers the power to consumers through secondary lines N1 through N5. Current transformers S1 through S5 have respective primaries connected in series with output regulators L1 to L5 in the secondary lines N1 to N5. The output regulators L1 through L5 which are arranged in series with the primaries of the transformers S1 to S5 may be considered transmitters. The secondary outputs of the current transformers S1 to S5 feed voltage signals, that correspond to the currents or the powers through the secondary lines, to the input terminal K1 through K5 of a control device S. The current transformers S1 through S5 are of known types suitable for use with the power supply system which feeds alternating or three phase current of a defined frequency and voltage.

A plurality of outputs F1 to F5 of the control device S are connected to second inputs of the output regulators L1 to L5. Depending upon the manner in which the control device S is set, control pulses passing through the regulators L1 through L5 serve to regulate the outputs of the secondary lines correspondingly. The control device S serves to monitor the load of the main line H1.

According to one embodiment of the invention the control device S acts as a proportional regulator. The control device responds only if the sum of the voltages at the input K1 to K5 exceeds a value corresponding to the maximum value of the total power of all secondary lines determined by the load capacity of the main line. A voltage signal is then fed to the output F1 to F5 which is proportional to the input of the voltages K to K5. The device S determines the common variation ratio from the positive difference of the actual value and of the nominal value of the sum of all voltages at the input K1 to K5. It then constrains the output regulators L1 ro L5 to reduce the power in the secondary lines by this ratio until there is no control voltage from the control device in the output regulators. The actual value is then less than or equal to the nominal value of the summation voltage at the terminals K1 through K5.

Because of the proportionality of the current transformers and the voltage constancy, the current transformer then exhibits a value less than or equal to the nominal value of the total power in all secondary lines.

According to one embodiment of the invention the output regulators L1 through L5 are voltage controlled semiconductors, such as silicon controlled rectifiers, arranged in vertical or horizontal phase sections. The output regulators may also be composed of switching tubes such as ignitrons or thyratrons controlled according to the same principle. They may also be in the form of adjustable transformers with mechanically variable iron cores.

Instead of five secondary lines as shown in FIG. 1, any number of secondary lines may be used.

A specific method of operating embodiments of the invention is described with reference to FIG. 2. The latter shows the secondary line N1 with the output regulator L1. The secondary line L1 is divided into two branches 1 and 2. The second current transformer 3 and an output limiter 4 is arranged in series with the branch line 1. A connection 5 supplies a voltage signal from current transformer 3 to a third input of output regulator L1 which is installed in the branch line L2. The voltage signal corresponds to the actual power in the branch line 1. An output limiter 4 keeps this power below the prescribed maximum value of the secondary line N1. This maximum value corresponds to the mean power consumption of the consumers. The output regulator L1 releases only as much power to branch line 2 as the positive difference between the nominal and actual power in the branch line 1.

The second input of the output regulator 1 receives signals from the output terminal F1 of the control device S. The latter provides a voltage signal only in case of an overload on main line H1 in order to reduce the power taken from the branch line 2. The admissable power for branch line 2 is thus influenced not only by current transformer 3 but also by control device S. The latter monitors the total power of the main line H1.

According to another embodiment of the invention the output limiter 4 can be one of the embodiments of output regulator L1 indicated on FIG. 1. But a fuse may be sufficient if the power drawn by loads on branch line 1 can never exceed the maximum value of the power in normal operation.

This method of electric power distribution makes it possible to connect a household's higher power appliances, mainly electric storage heaters. The available electric residual energy which is not required by the other electric household appliances can then be fed continuously by the output regulated to an electric storage heater. This energy can be stored, for example by heating a hot water reservoir. It can then be taken and used as required in the form of heat to heat the rooms of a house. This would permit a clean, safe, economical and optimal heating system since no new apparatus and auxiliary means would be required for its realization.

The regulators L1 through L5 may also use bilateral controlled switching diodes.

While embodiments of the invention have been described in detail it will be obvious to those skilled in the art that the invention may be embodied otherwise without departing from its spirit and scope.

What is claimed is:

1. A power distribution system comprising a main line, a plurality of secondary lines each connected to said main line for receiving energy therefrom, each of said secondary lines having a pair of branch lines, maximum regulator means in a first of said branch lines of each of said secondary lines for limiting the output to a given maximum value, output regulator means in the second of said branch lines in each of said secondary lines and responsive to the output of said first of said branch lines in the corresponding secondary line for regulating the flow of energy through each of said branch lines continuously so that the total power through the secondary lines does not exceed a defined maximum value, control means responsive to the total power through each of the secondary lines for controlling each of said output regulator means so that the sum of the power passed by all of said secondary lines does not exceed the load capacity of the main line.

2. A system as in claim 1, wherein said control means responds to the total power absorbed by the secondary lines for throttling the power absorbed by each of the said second branch lines in amount proportional to the exceeded power difference.

3. A system as in claim 1, wherein said output regulator means each includes a semiconductor discharge device.

4. A system as in claim 1, wherein said output regulator means each includes a control discharge tube.

5. A system as in claim 1, wherein said output regulator means each includes a thyratron.

6. A system as in claim 1 wherein each of said output regulator means includes an ignitron.

7. A system as in claim 1, wherein said output regulator means each includes a silicon controlled rectifier.

8. A system as in claim 1, wherein said output regulator means each includes an adjustable transformer having a mechanically variable iron core.

9. A system as in claim 1, wherein said output regulator means each includes a magnetic amplifier.

10. A power distribution system comprising, a main line, a plurality of secondary lines, each connected to said main line for receiving energy therefrom, each of said secondary lines having a pair of branch lines, output regulator means in one of said branch lines, each of said secondary lines and responsive to the output of the other of said branch lines in the corresponding secondary lines for regulating the flow of energy through each of said branch lines continuously so that the total power through the secondary lines does not exceed a defined maximum value.

11. A system as in claim 10, further comprising maximum regulator means in the other of said branch lines of each of said secondary lines for limiting the output of the other of said branch lines in each of said secondary lines to a given maximum value.

12. A system as in claim 10, wherein said output regulator means responds to the difference between a given desired maximum output value of power through the other of said branch lines in each pair and the actual power so as to permit the one of the branch lines in each pair to pass the remainder of the power between the actual power and the maximum power.

13. A system as in claim 1, wherein said output regulator means responds to the difference between a given desired maximum output value of power through the other of said branch lines in each pair and the actual power so as to permit the one of the branch lines in each pair to pass the remainder of the power between the actual power and the maximum power.

* * * * *